(12) United States Patent
Ly et al.

(10) Patent No.: US 11,452,108 B2
(45) Date of Patent: Sep. 20, 2022

(54) SLOT INDICATION FOR NR HALF-DUPLEX FDD OPERATION

(71) Applicant: QUALCOMM Incorporated, San Diego, CA (US)

(72) Inventors: Hung Dinh Ly, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 17/142,121

(22) Filed: Jan. 5, 2021

(65) Prior Publication Data

US 2021/0227550 A1 Jul. 22, 2021

Related U.S. Application Data

(60) Provisional application No. 62/964,043, filed on Jan. 21, 2020.

(51) Int. Cl.
*H04W 72/04* (2009.01)
*H04W 76/27* (2018.01)
*H04L 5/16* (2006.01)

(52) U.S. Cl.
CPC ........... *H04W 72/0493* (2013.01); *H04L 5/16* (2013.01); *H04W 72/042* (2013.01); *H04W 72/0446* (2013.01); *H04W 76/27* (2018.02)

(58) Field of Classification Search
CPC ........... H04W 72/0493; H04W 72/042; H04W 72/0446; H04W 76/27; H04L 5/16
See application file for complete search history.

(56) References Cited

U.S. PATENT DOCUMENTS

| 2019/0141742 | A1* | 5/2019 | Zhou ..................... H04L 5/0057 |
| 2019/0312665 | A1 | 10/2019 | Jo et al. |
| 2019/0313476 | A1 | 10/2019 | Sun et al. |

(Continued)

FOREIGN PATENT DOCUMENTS

| EP | 3684123 A1 | 7/2020 |
| EP | 3700273 A1 | 8/2020 |

(Continued)

OTHER PUBLICATIONS

International Search Report and Written Opinion—PCT/US2021/012366—ISA/EPO—dated Apr. 20, 2021.

*Primary Examiner* — Melvin C Marcelo
(74) *Attorney, Agent, or Firm* — Procopio, Cory, Hargreaves & Savitch LLP/Qualcomm

(57) ABSTRACT

A configuration to enable a UE to monitor downlink control to determine a slot direction while operating in a half duplex operation in a FDD mode. The apparatus receives an indication of a slot pattern for a plurality of slots, wherein the slot pattern indicates the plurality of slots includes at least one flexible slot. The apparatus receives a downlink control monitoring occasion configuration. The apparatus monitors for downlink control from a base station based at least on the indication of the slot pattern and on the monitoring occasion configuration. The apparatus determines whether the at least one flexible slot is an uplink slot or a downlink slot based on a DCI. The apparatus transmits or receives communications on the slot based on the determination.

30 Claims, 11 Drawing Sheets

(56) References Cited

U.S. PATENT DOCUMENTS

2020/0214006 A1* 7/2020 Choi .................. H04L 1/1858
2021/0227551 A1* 7/2021 Ly .................... H04L 27/2602

FOREIGN PATENT DOCUMENTS

| KR | 20190046699 A | 5/2019 |
| WO | 2019032821 A1 | 2/2019 |
| WO | 2019050381 A1 | 3/2019 |
| WO | 2019194624 A1 | 10/2019 |

* cited by examiner

SLOT INDICATION FOR NR HALF-DUPLEX FDD OPERATION

CROSS REFERENCE TO RELATED APPLICATION(S)

This application claims the benefit of U.S. Provisional Application Ser. No. 62/964,043, entitled "Slot Indication for NR Half-Duplex FDD Operation" and filed on Jan. 21, 2020, which is expressly incorporated by reference herein in its entirety.

BACKGROUND

Technical Field

The present disclosure relates generally to communication systems, and more particularly, to a configuration for slot indication in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. Mobile devices that support 5G NR may use higher spectrum bands that may not be used for wireless communications under previous wireless communications standards. Some UEs (e.g., premium UEs) may target increased throughput, increased processing capability, and high power computation which may result in increased hardware costs and reduced battery life. However, other devices (e.g., lower tier UEs or reduced capability UEs) may be suitable for applications that may not require the increased throughput, increased processing capability, and high power computation of premium UEs. Aspects presented herein enable communication systems, such as systems based on NR, to be scalable and deployable in a more efficient and cost-effective manner. Scaling NR for lower tier UEs or reduced capability UEs may allow for peak throughput, latency, and reliability requirements being relaxed in comparison to premium devices.

In an aspect of the disclosure, a method, a computer-readable medium, and an apparatus are provided. The apparatus may be a device at a UE. The device may be a processor and/or a modem at a UE or the UE itself. The apparatus may include a user equipment (UE) operating in a half duplex operation in a frequency division duplexing (FDD) mode. The apparatus receives an indication of a slot pattern for a plurality of slots, wherein the slot pattern indicates the plurality of slots includes at least one flexible slot. The apparatus receives a downlink control monitoring occasion configuration. The apparatus monitors for downlink control from a base station based at least on the indication of the slot pattern and on the monitoring occasion configuration. The apparatus determines whether the at least one flexible slot is an uplink slot or a downlink slot based on a downlink control information (DCI). The apparatus transmits or receives communications on the slot based on the determination.

In an aspect of the disclosure, a method, a computer-readable medium, and an apparatus are provided. The apparatus may be a device at a base station. The device may be a processor and/or a modem at a base station or the base station itself. The apparatus may include a base station configured to communication with a UE operating in half duplex operation in a FDD mode. The apparatus transmits an indication of a slot pattern for a plurality of slots, wherein the slot pattern indicates the plurality of slots includes at least one flexible slot. The apparatus transmits downlink control to the UE based at least on the indication of the slot pattern. The apparatus transmits DCI scheduling communication for the UE, wherein the DCI indicates that the at least one flexible slot is an uplink slot or a downlink slot. The apparatus transmits or receives communications on the slot based on the DCI indicating that the at least one flexible slot is the uplink slot or the downlink slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
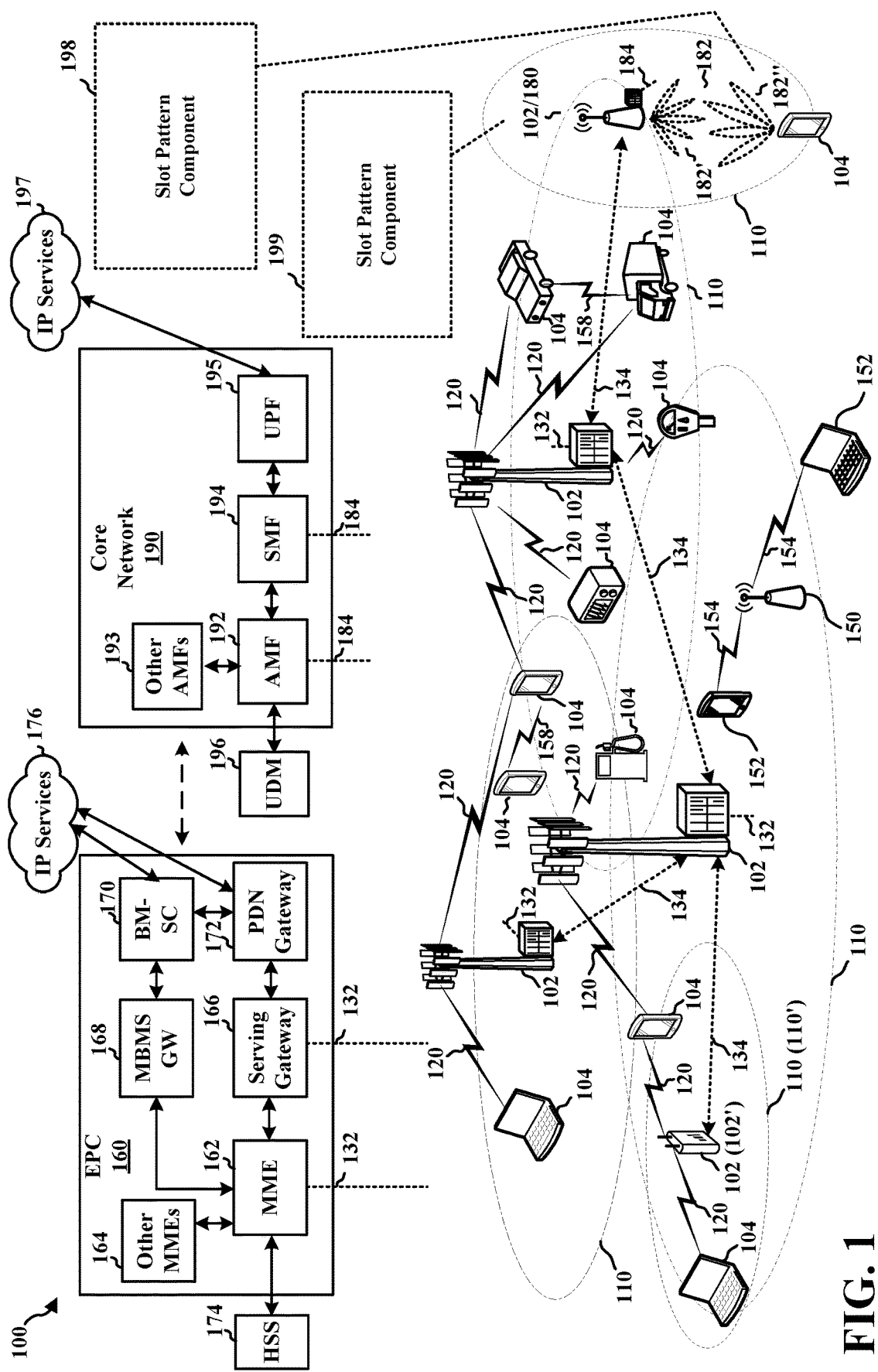
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to monitor downlink control to determine a slot direction while operating in a half duplex operation in an FDD mode. For example, the UE 104 of FIG. 1 may include a slot pattern component 198 configured to receive an indication of a slot pattern for a plurality of slots. The UE 104 may receive the indication of the slot pattern for the plurality of slots, where the slot pattern indicates the plurality of slots includes at least one flexible slot. The UE 104 may receive a downlink control monitoring occasion configuration. The UE 104 may monitor for downlink control from a base station 102/180 based at least on the indication of the slot pattern and on the monitoring occasion configuration. The UE 104 may determine whether the at least one flexible slot is an uplink slot or a downlink slot based on a DCI. The UE 104 may transmit or receive communications on the slot based on the determination.

Referring again to FIG. 1, in certain aspects, the base station 102/180 may be configured to transmit downlink control to a UE such that the UE may determine a slot direction while operating in a half duplex operation in a FDD mode. For example, the base station 102/180 of FIG. 1 may include a slot pattern component 199 configured to transmit an indication of a slot pattern for a plurality of slots. The base station 102/180 may transmit the indication of the slot pattern for the plurality of slots, where the slot pattern indicates the plurality of slots includes at least one flexible slot. The base station 102/180 transmits downlink control to the UE 104 based at least one the indication of the slot pattern. The base station 102/180 transmits DCI scheduling communication for the UE 104, where the DCI indicates that the at least one flexible slot is an uplink slot or a downlink slot. The base station 102/180 transmits or receives communications on the slot based on the DCI indicating that the at least one flexible slot is the uplink slot or the downlink slot.

Although the following description may be focused on 5G NR, the concepts described herein may be applicable to other similar areas, such as LTE, LTE-A, CDMA, GSM, and other wireless technologies.

Figure 2:
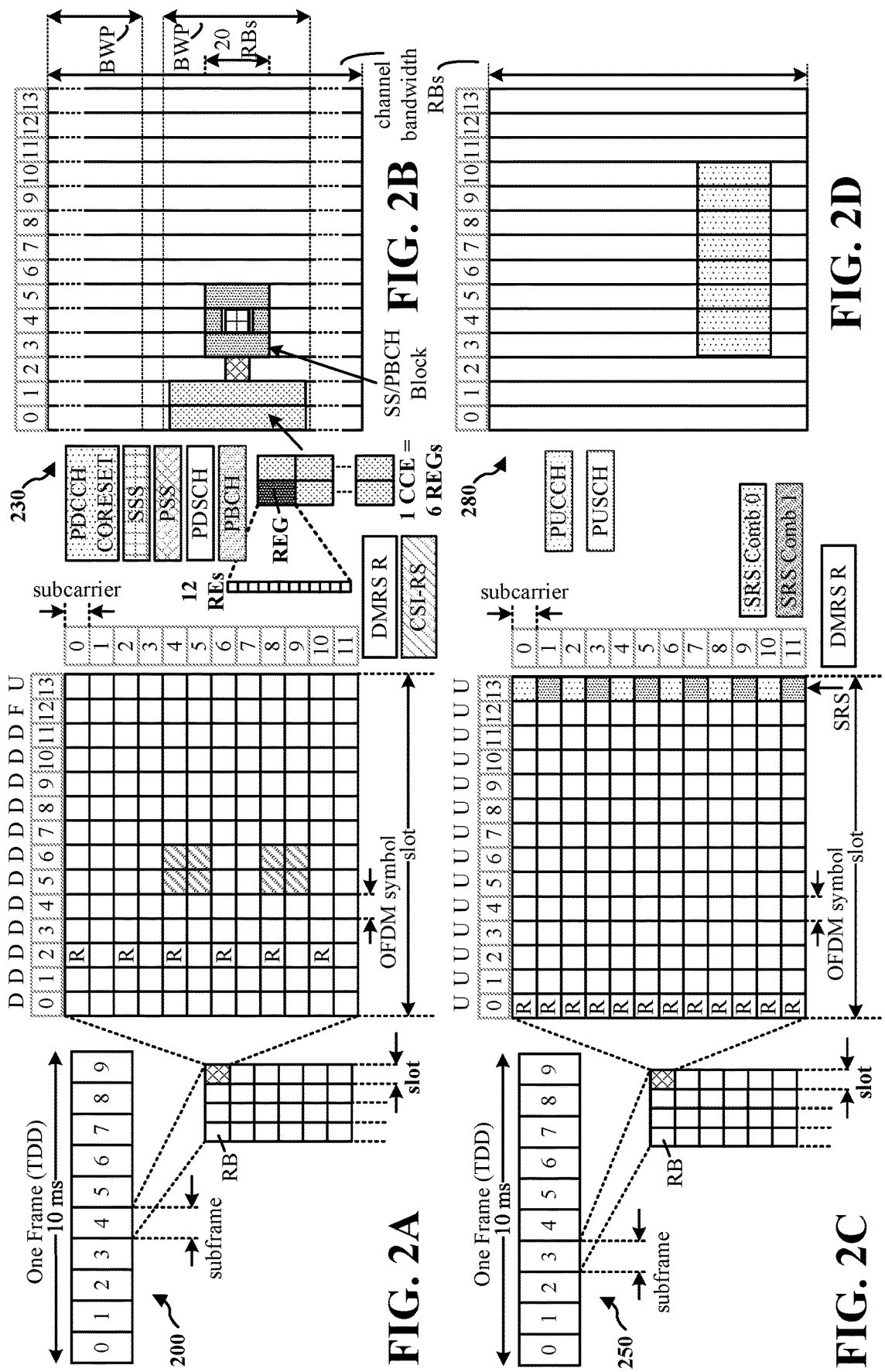
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
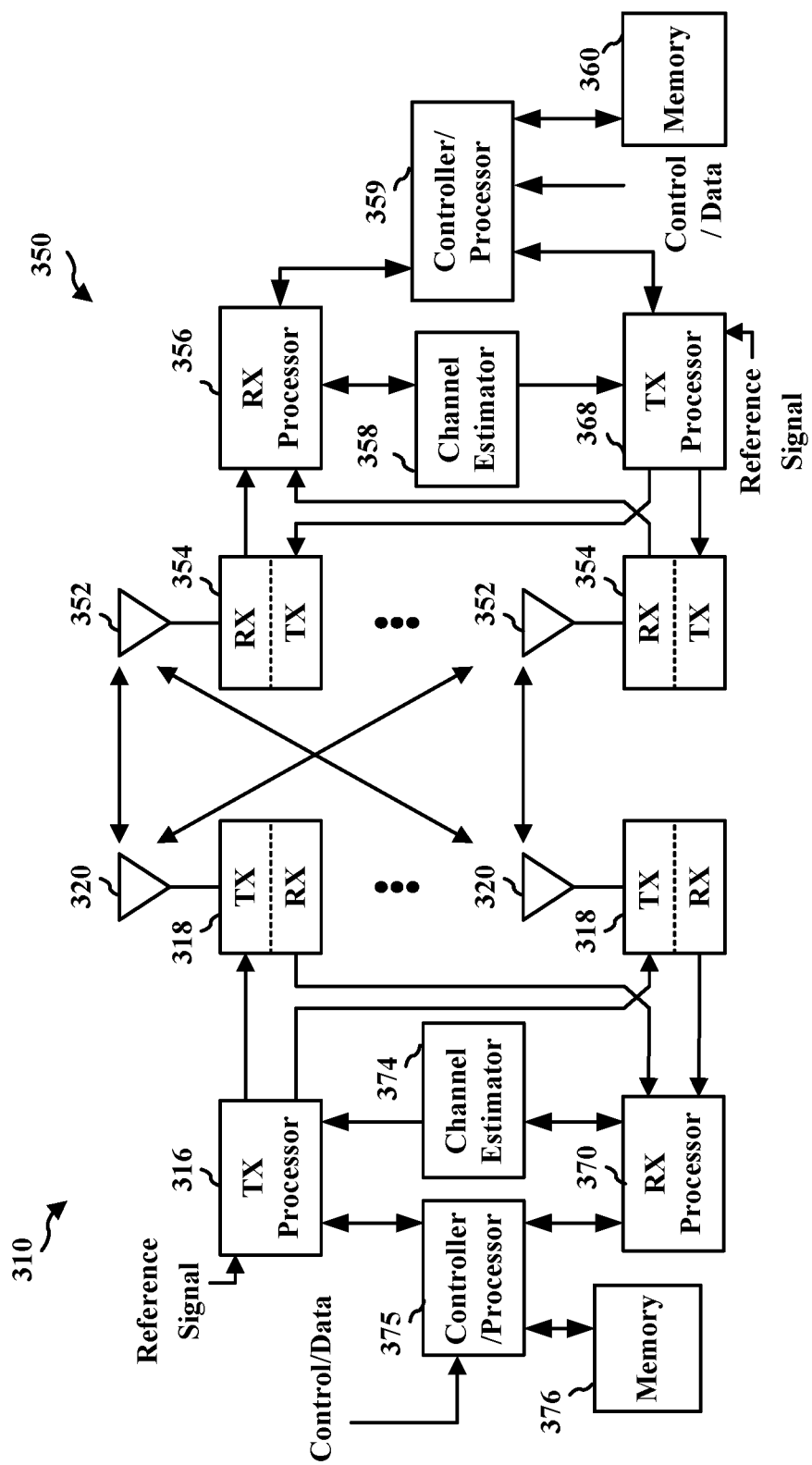
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
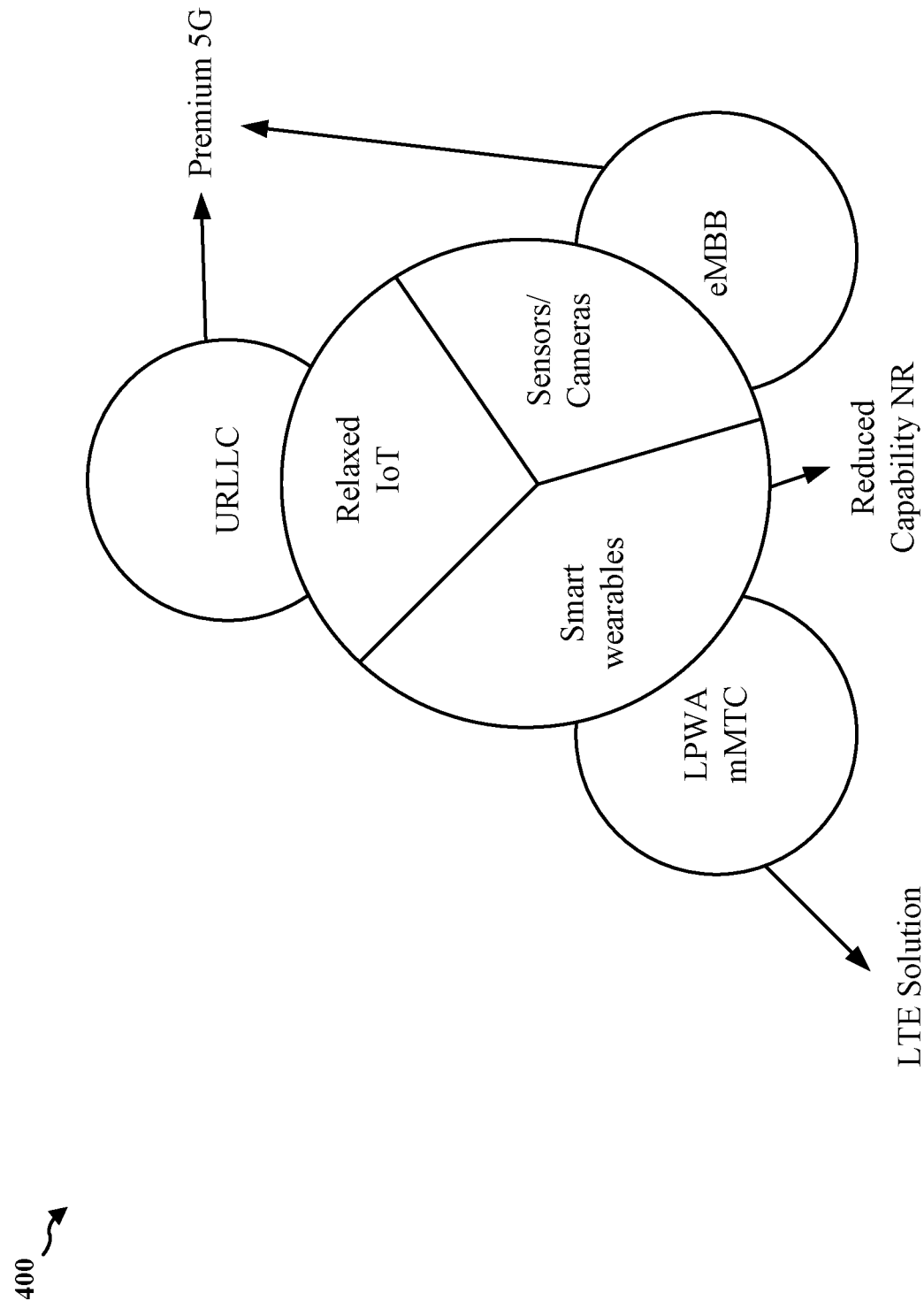
FIG. 4 is a diagram illustrating a wireless communication network in accordance with aspects of the disclosure.

Mobile devices that support 5G NR may use higher spectrum bands that were not available to be used for wireless communications under previous wireless communications standards. Some UEs may target increased throughput, increased processing capability, and high power computation which may result in increased hardware costs and reduced battery life. Communication system may provide a strong baseline for NR considering advanced and diverse requirements for services directed for premium smartphones, such as eMBB, URLLC, V2X, etc., as shown in diagram 400 of FIG. 4. However, other devices, e.g., lower tier UEs or reduced capability UEs, may be suitable for applications that may not require the increased throughput, increased processing capability, and high power computation of premium UEs. Aspects presented herein help enable communication systems, such as systems based on NR, to be scalable and deployable in a more efficient and cost-effective manner. Scaling NR for lower tier UEs or reduced capability UEs may allow for peak throughput, latency, and reliability requirements being relaxed in comparison to premium devices, as shown in diagram 400 of FIG. 4. In addition, scaling NR for lower tier UEs or reduced capability UEs may allow for an improvement in efficiency (e.g., power consumption and system overhead) and improvement in cost.

Figure 5:
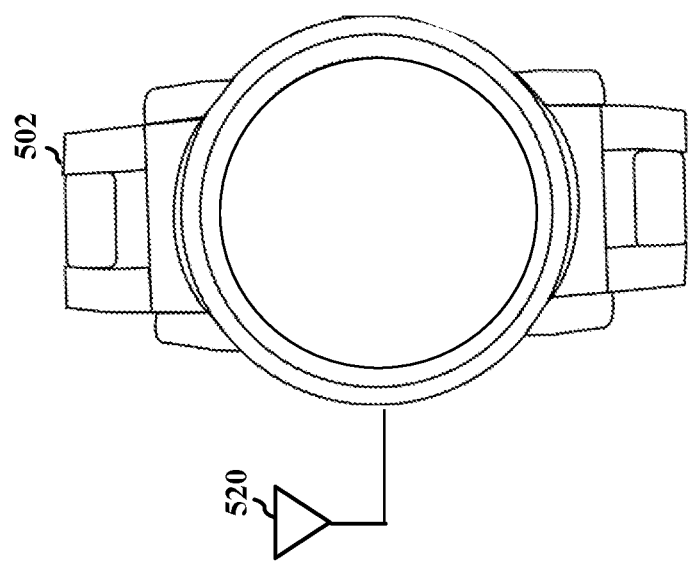
FIG. 5 is an example of a wireless device in accordance with aspects of the disclosure.

These lower tier devices may be referred to as "reduced capability NR" devices, where the lower tier UEs or reduced capability UEs may include low-tier devices and/or mid-tier devices. For example, reduced capability NR devices may be suitable for low end UEs, wearable devices, industrial wireless sensor networks, surveillance cameras, and the like. FIG. 5 provides an example 500 of a smart wearable 502, which may be a use case for a reduced capability NR. The smart wearable 502, such as a smart wrist watch, may be small in size and have industrial design and battery size constraints. In addition, the number of antennas, the device complexity, and peak power consumption may be reduced, in comparison to a premium UE. In some instances, the smart wearable 502 may have a maximum capacity envelope similar to LTE CAT4 and may be within the target of 10-20 MHz bandwidth for FR1, for example. The smart wearable 502 may have 2 antennas 520 or fewer, and may have a peak throughput for FDD on the order of 150 Mbps downlink and 50 Mbps uplink. The smart wearable 502 may include latency requirements being similar to or slightly more relaxed than eMBB. Mobility, coverage, and reliability requirements should also be similar to eMBB. While support for longer discontinuous reception (DRX) cycle may be considered for some scenarios. The battery life may be targeted to last for at least multiple days.

Figure 6:
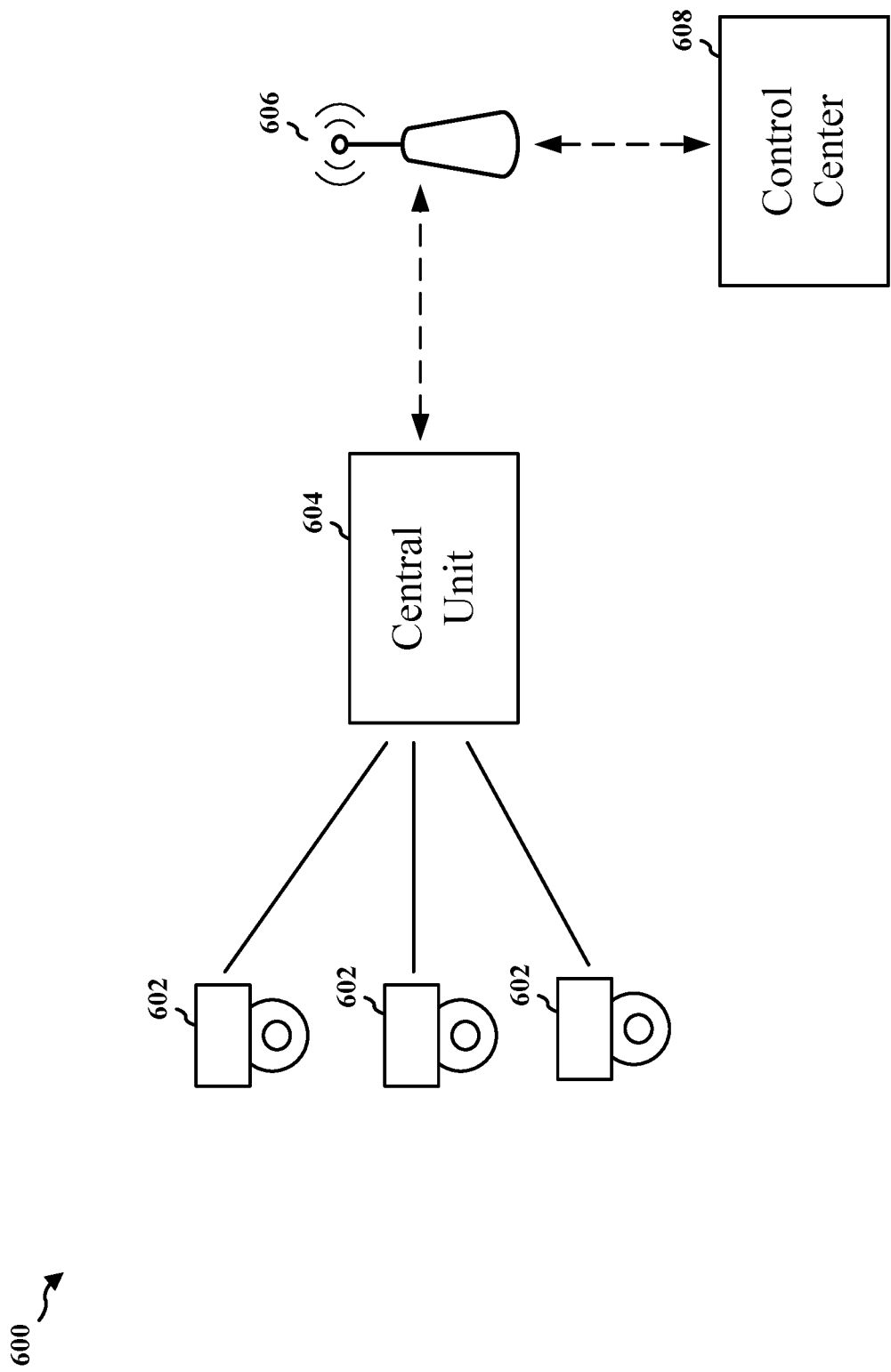
FIG. 6 is an example of a wireless device in accordance with aspects of the disclosure.

FIG. 6 provides an example of a reduced capability NR device. The diagram 600 of FIG. 6 provides an example of video surveillance as a use case for a reduced capability NR device. Surveillance cameras use cases may include city surveillance, factory monitoring, safety cameras, etc. Different use cases may have different data rates. For example, low resolution video may be utilized for city surveillance, while high definition video may be utilized for factory and/or farm monitoring. In some aspects, traffic cameras may be configured to operate in an on-demand configuration, such that the traffic cameras may operate in response to alarms or triggered by some event and/or emergency services. The camera may be battery operated or may be powered by an external power supply. The surveillance cameras may be configured based on a moderate latency of less than 500 ms, a reliability of up to 99.9%, and may be stationary or have low mobility. The surveillance cameras may also have a medium to high uplink data rate (e.g., up to 25 Mbps) in order to support the uplink dominant traffic, while having a much lower downlink rate.

In addition, surveillance cameras, as use cases for reduced capacity NR devices, may have a high connection density, such that multiple surveillance cameras may be served in a serving cell. For example, as shown in FIG. 6, multiple surveillance cameras 602 may be connected to central unit 604 that is in communication with a wireless network 606. The central unit 604 may operate the multiple cameras 602 and receive uplink transmissions from each of the multiple cameras 602, such that the central unit 604 may transmit such data via the wireless network 606.

A low-end smartphone is another example of a reduced capability NR device. For example, the low-end smartphone may have a reduced number of receivers and supported bandwidth. In some instances, the low-end smartphone may have 2 receivers in bands, whereas a premium smartphone may have a minimum of 4 receivers. The low-end smartphones may use a maximum bandwidth of 20, 30, 40, or 50 MHz for FR1, and/or allow for a maximum bandwidth of 50 or 100 MHz for FR2.

In wireless networks, UEs operating in half duplex in an NR FDD band can reduce UE complexity in comparison to full duplex operation by removing a duplexer per FDD band, which may reduce UE complexity in multi-band support. Half duplex operation in the FDD band may also provide a smaller insertion loss and improve RF performance without the duplexer. UE complexity may also be reduced by using TDD HARQ timeline for the half duplex operation in the FDD mode. For example, the UE baseband implementation for TDD can be used for the half duplex operation in the FDD mode. The base station may operate in either full duplex mode or half duplex operation for communication in the FDD bands.

With half duplex FDD, the slot direction (e.g., uplink, downlink) in an FDD band may not be all uplink or all downlink, such that a slot direction may be identified for UEs operating in half duplex FDD. The present disclosure improves the manner in which the slot direction is indicated to a reduced capacity NR device operating in half duplex FDD. The network may not provide an indication as to the slot direction. As such, a UE may monitor downlink control in accordance with a search space configuration. The uplink or downlink direction for a slot may be determined by the received grant. For example, if the slot is scheduled for downlink, the slot is determined to be a downlink slot (e.g., all the symbols in the slot are downlink symbols). Similarly, if the slot is scheduled for uplink, the slot is determined to be an uplink slot (e.g., all the symbols in the slot are uplink symbols).

Figure 7:
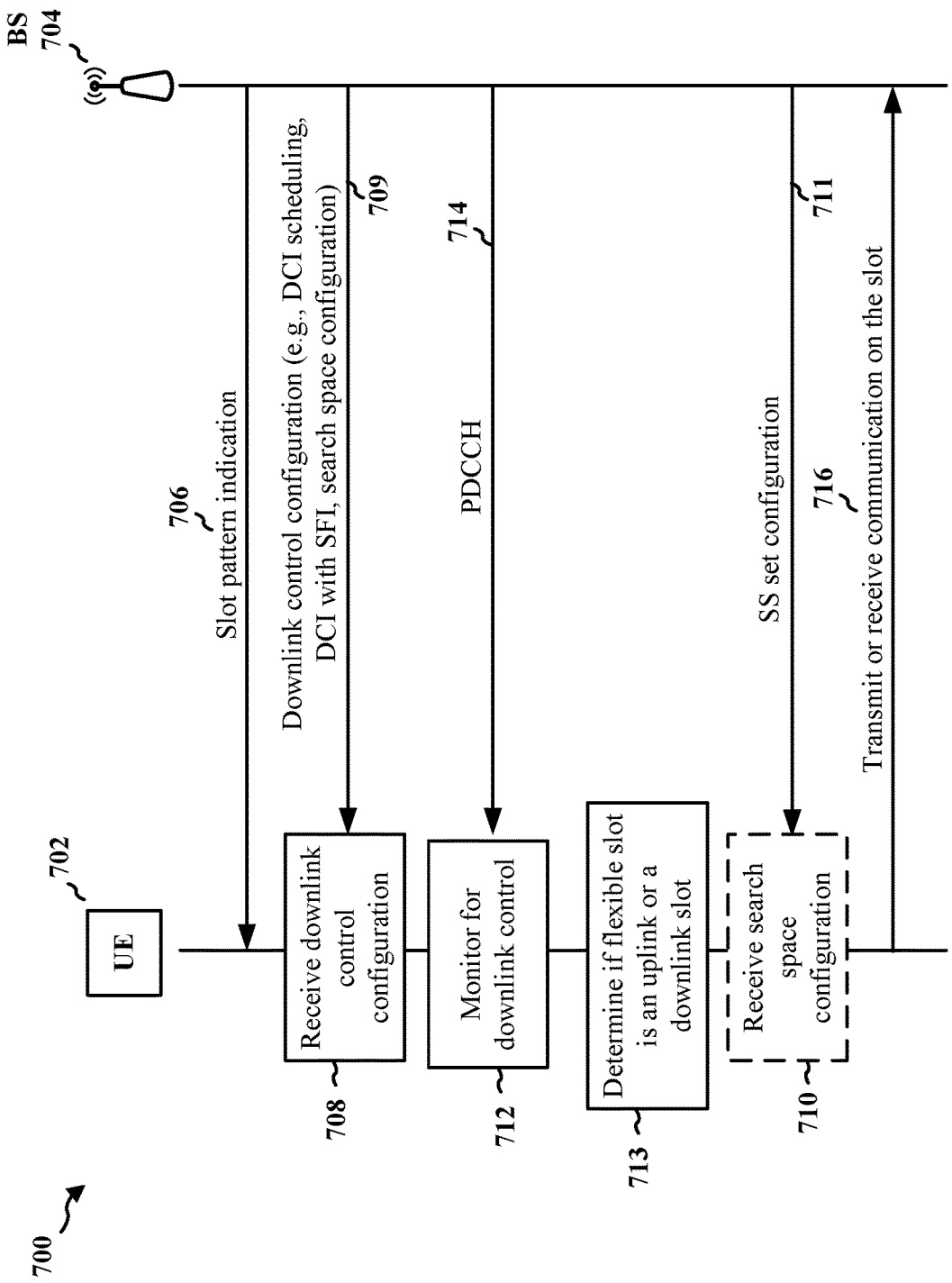
FIG. 7 is a call flow diagram of signaling between a UE and a base station.

FIG. 7 is a call flow diagram 700 of signaling between a UE 702 and a base station 704. The base station 704 may be configured to provide at least one cell. The UE 702 may be configured to communicate with the base station 704. For example, in the context of FIG. 1, the base station 704 may correspond to base station 102/180 and, accordingly, the cell may include a geographic coverage area 110 in which communication coverage is provided and/or small cell 102' having a coverage area 110'. Further, a UE 702 may correspond to at least UE 104. In another example, in the context of FIG. 3, the base station 704 may correspond to base station 310 and the UE 702 may correspond to UE 350. Optional aspects are illustrated with a dashed line.

The base station 704 may be communicating with a UE 702 operating in half duplex operation in an FDD mode. As illustrated at 706, the base station 704 may transmit a slot pattern indication to the UE 702. The slot pattern indication may be sent to the UE separate from scheduling communication with the UE, e.g., may be sent separately from scheduling DCI. Thus, in some examples, the UE may be able to at least partially, determine a slot pattern before receiving scheduling DCI. In some aspects, the indication of the slot pattern may be transmitted in system information or in RRC signaling to the UE. In some aspects, the slot pattern may comprise a UE specific slot pattern or a UE group specific slot pattern. The slot pattern indication 706 may comprise a slot pattern for a plurality of slots. In some aspects, the slot pattern may indicate that each of the plurality of slots may include one of an uplink slot, a downlink slot, a special slot, or a flexible slot. The slot pattern may indicate that the plurality of slots includes at least one flexible slot. An uplink slot is a slot having all uplink symbols. A downlink slot is a slot having all downlink symbols. A special slot may include a mixture of uplink and downlink symbols. A flexible slot may include flexible symbols that may be configured to be either uplink symbols or downlink symbols. Each symbol in a flexible slot may be a flexible symbol.

In some aspects, for example where the slot is indicated as a flexible slot in the slot indication pattern, the UE 702 may determine whether the slot is an uplink slot or a downlink slot. In some aspects, for example as illustrated at 709, the base station 704 may transmit a downlink control monitoring occasion configuration. In some aspects, the downlink control monitoring occasion configuration may include DCI scheduling communication for the UE 702, such that the communication is scheduled in the DCI. The UE 702 may receive the downlink control monitoring occasion configuration, as illustrated at 708. In some aspects, the base station 704 may transmit a downlink control signal, as illustrated at 709, wherein the downlink control signal may comprise the DCI scheduling communication for the UE.

As illustrated at 712, the UE 702 may monitor for downlink control (e.g., PDCCH) from the base station 704 based at least one the indication of the slot pattern and on the monitoring occasion configuration. In some aspects, the UE may monitor for downlink control when a search space occasion occurs in a flexible slot according to the indicated slot pattern. The base station 704 may transmit the downlink control (e.g., PDCCH) to the UE 702, as illustrated at 714. For example, the UE may treat the flexible slot as a default downlink slot for the purposes of determining whether to monitor for PDCCH during a particular search space occasion. In some aspects, the UE may treat the flexible slot as a null slot and may determine not to perform monitoring when a search space occasion occurs within a flexible slot based on the indicated slot pattern. In some aspects, the UE may determine not to perform actions during a flexible slot. In another example, the UE may treat the flexible slot as an uplink slot. For example, the UE may determine not to monitor for PDCCH during a SS occasion that occurs within a flexible slot.

As illustrated at 713, the UE 702 may determine that the at least one flexible slot is an uplink slot or a downlink slot. The UE 702 may determine that the flexible slot is the uplink slot or the downlink slot based on DCI. In some aspects, the downlink control signal may comprise a DCI with SFI or a search space configuration. The UE 702 may use the scheduling DCI to determine whether the flexible slot is the uplink slot or the downlink slot. In some aspects, the UE may determine the flexible slot to be the uplink slot if the DCI 709 schedules uplink resources for an uplink transmission from the UE 702. In some aspects, the UE may determine the flexible slot to be the downlink slot if the DCI 709 schedules downlink resources for a downlink transmission to the UE 702. In some aspects, the UE may determine that the flexible slot is the uplink slot or the downlink slot based on the SFI of the DCI.

In some aspects, if a flexible slot is a downlink slot, the UE 702 may determine whether to monitor for PDCCH during the slot. For example, as illustrated at 711, the base station 704 may transmit a search space configuration to the UE 702. The UE 702 may receive the search space set configuration, as illustrated at 710. The search space set configuration may provide time and frequency resources for the UE to use to monitor for PDCCH from the base station 704. The search space configuration may provide the UE with a search space occasion, e.g., a period of time, for monitoring for PDCCH. In some aspects, the UE 702 may receive a search space set configuration and may determine whether to monitor for PDCCH from the base station 704, e.g., at 712, if a search space set occasion based on the search space set configuration occurs in the flexible slot.

As illustrated at 716, the UE 702 may transmit or receive communications on the slot based on the determination. The UE may transmit or receive communication with the base station 704. In some aspects, the UE may transmit or receive communications with the base station 704 during the search space set occasion that occurs in the flexible slot, e.g., based on treating the flexible slot as an uplink slot. In some aspects, the uplink transmission may include a random access transmission, e.g., a physical random access channel (PRACH) transmission from the UE to the base station. In another example, the uplink transmission may include a Msg3 PUSCH transmission to a base station, such as a target cell in a handover. The PRACH transmission and Msg3 PUSCH transmission are merely examples of an uplink transmission from a UE during a flexible slot, and the UE may also transmit other types of uplink transmissions. In some aspects, the base station may determine whether to transmit PDCCH to the UE, or to monitor for an uplink transmission from the UE, based on whether the slot of the plurality of slots is a flexible slot in the slot indication pattern.

Figure 8:
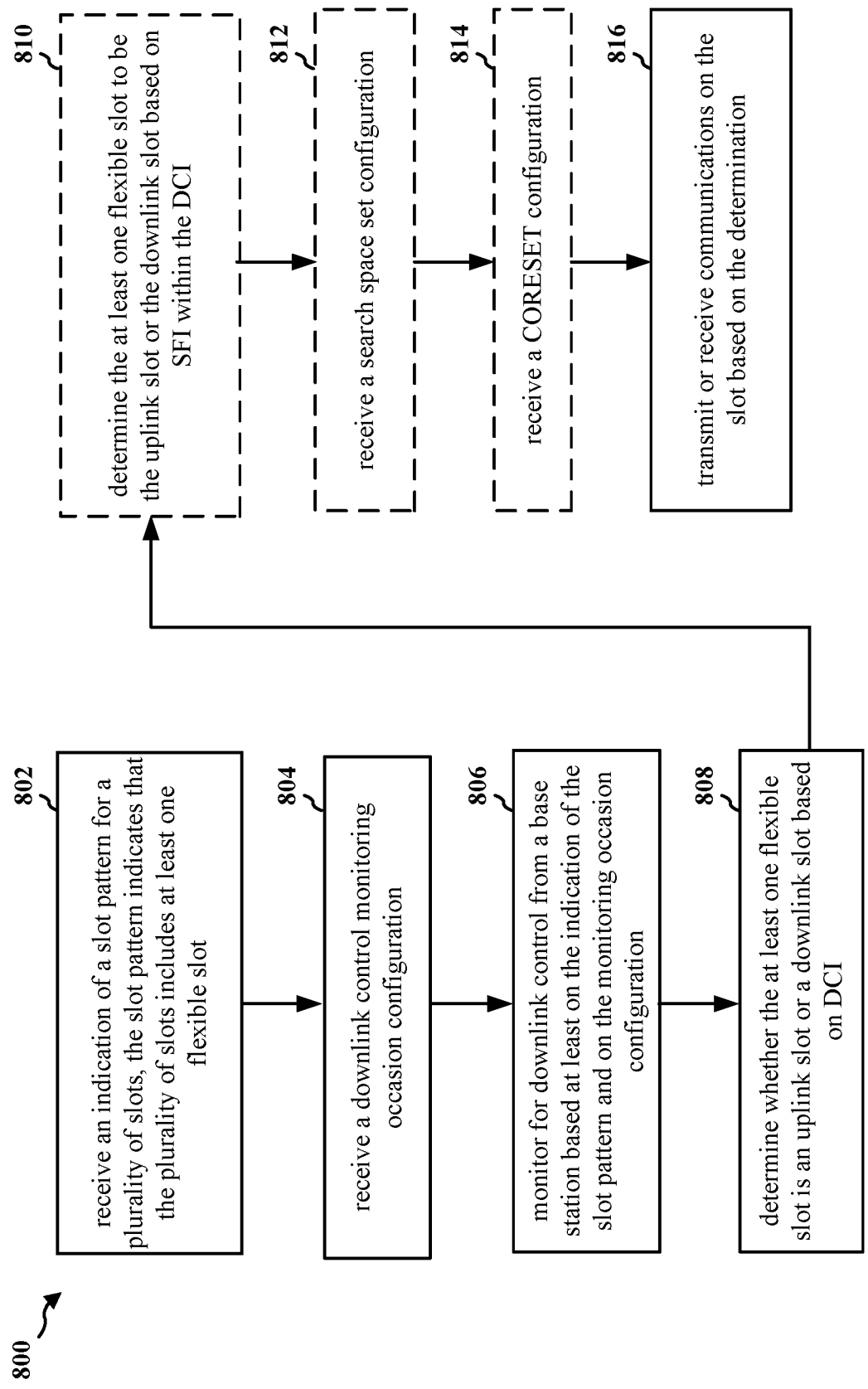
FIG. 8 is a flowchart of a method of wireless communication.

FIG. 8 is a flowchart 800 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may enable a UE to monitor downlink control to determine a slot direction while operating in a half duplex operation in a FDD mode.

At 802, the UE receives an indication of a slot pattern for a plurality of slots. For example, 802 may be performed by slot pattern component 940 of apparatus 902. The slot pattern may indicate that each of the plurality of slots may include one of an uplink slot, a downlink slot, a special slot, or a flexible slot. The slot pattern may indicate that the plurality of slots includes at least one flexible slot. In some aspects, the indication of the slot pattern may be received in system information or in RRC signaling. In some aspects, the slot pattern may comprise a UE specific slot pattern or a UE group specific slot pattern.

At 804, the UE may receive a downlink control monitoring occasion configuration. For example, 804 may be performed by configuration component 942 of apparatus 902. The UE may receive the downlink control monitoring occasion configuration from the base station. The UE may monitor for monitor occasions based on the downlink control monitoring occasion configuration. In some aspects, in instances where a slot of the plurality of slots is a flexible slot, the UE may receive DCI scheduling communication for the UE.

At 806, the UE may monitor for downlink control from the base station. For example, 806 may be performed by monitor component 944 of apparatus 902. The UE may monitor for downlink control from the base station based at least in part on the indication of the slot pattern. In some aspects, the UE may monitor for PDCCH from the base station when a search space occasion occurs in the flexible slot.

At 808, the UE may determine the at least one flexible slot to be an uplink slot or a downlink slot. For example, 808 may be performed by determination component 946 of apparatus 902. The UE may determine the flexible slot to be the uplink slot or the downlink slot based at least on the indication of the slot pattern and on the monitoring occasion configuration. In some aspects, the flexible slot may be determined to be the uplink slot if the DCI schedules uplink resources for an uplink transmission from the UE. In some aspects, the flexible slot is determined to be the downlink slot if the DCI schedules downlink resources for a downlink transmission to the UE.

In some aspects, for example at 810, the UE may determine the at least one flexible slot to be the uplink slot or the downlink slot based on an SFI within the DCI. For example, 810 may be performed by SFI component 948 of apparatus 902. In some aspects, the flexible slot may be determined to be the uplink slot or the downlink slot based on the SFI of the DCI. For example, the SFI of the DCI may indicate that the flexible slot is the uplink slot or the downlink slot.

In some aspects, for example at 812, the UE may receive a search space set configuration. For example, 812 may be performed by search space component 950 of apparatus 902. The UE may receive the search space set configuration from the base station. In some aspects, the UE may receive the search space set configuration, such that the UE monitors for the downlink control from the base station if a search space set occasion based on the search space set configuration occurs in the flexible slot. In some aspects, the UE may receive the search space set configuration, such that the UE does not monitor for the downlink control from the base station if the search space set occasion based on the search space set configuration occurs in the flexible slot. In some aspects, the UE may transmit uplink communications to the base station during the search space set occasion that may occur in the at least one flexible slot.

In some aspects, for example at 814, the UE may receive a CORESET configuration. For example, 814 may be performed by CORESET component 952 of apparatus 902. The UE may receive the CORESET configuration from the base station. In some aspects, the UE may monitor for the downlink control from the base station if at least one symbol of the configured CORESET overlaps with the at least one flexible slot. In some aspects, the UE may not monitor for the downlink control from the base station if at least one symbol of the configured CORESET overlaps with the at least one flexible slot.

At 816, the UE may transmit or receive communication on the slot. For example, 816 may be performed by communication component 954 of apparatus 902. The UE may transmit or receive the communications on the slot based on the determination of the at least one flexible slot being the uplink slot or the downlink slot. In some aspects, the UE may transmit uplink communication to the base station during the space set occasion that occurs in the flexible slot. In some aspects, the uplink transmission may include a random access transmission, e.g., a physical random access channel (PRACH) transmission from the UE to the base station. In another example, the uplink transmission may include a Msg3 PUSCH transmission to a base station, such as a target cell in a handover.

Figure 9:
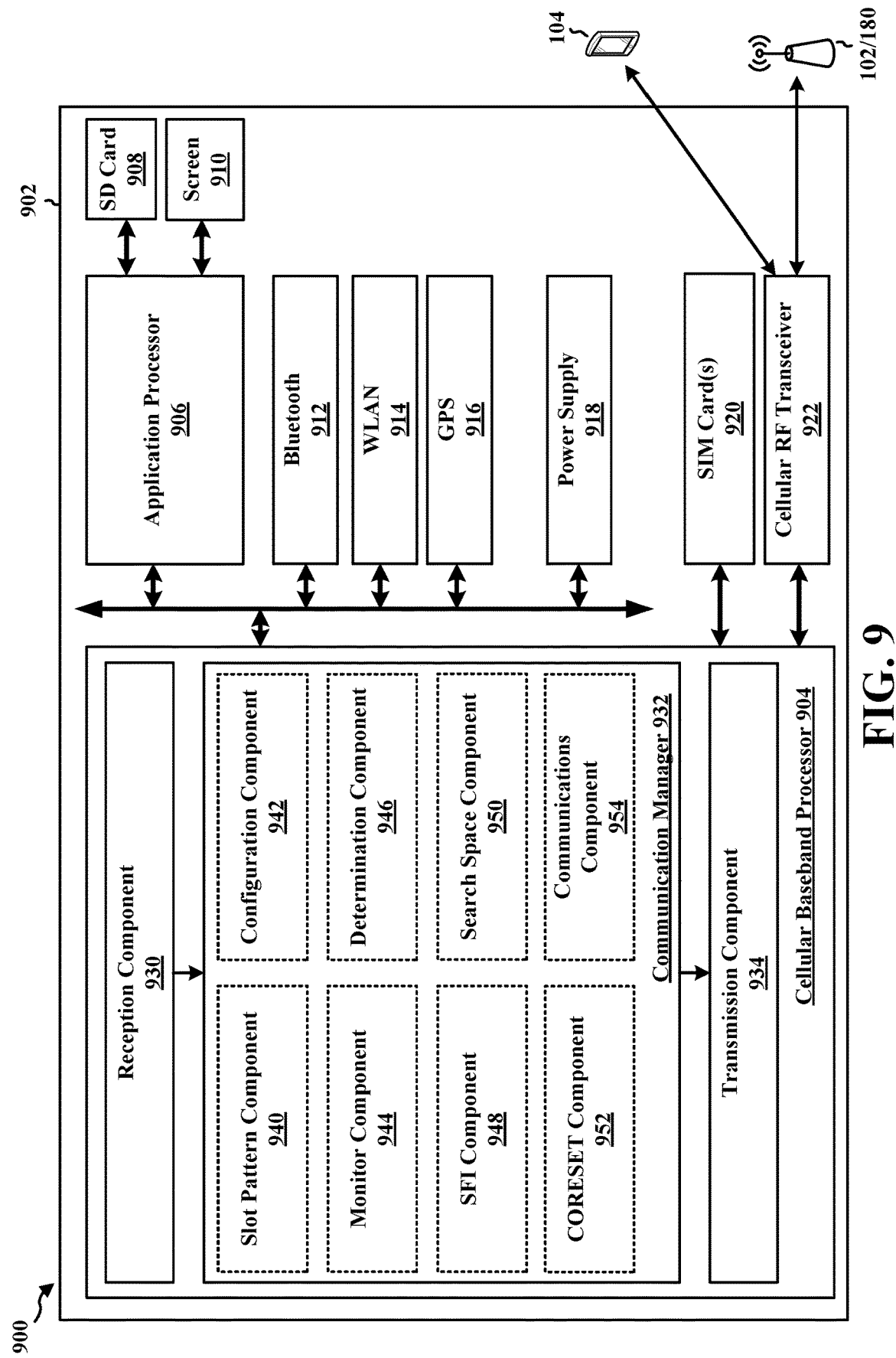
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the cellular baseband processor 904, and in another configuration, the apparatus 902 may be the entire UE (e.g., see 350 of FIG. 3) and include the aforediscussed additional modules of the apparatus 902.

The communication manager 932 includes a slot pattern component 940 that is configured to receive an indication of a slot pattern for a plurality of slots, e.g., as described in connection with 802 of FIG. 8. The communication manager 932 further includes a configuration component 942 that is configured to receive a downlink control monitoring occasion configuration, e.g., as described in connection with 804 of FIG. 8. The communication manager 932 further includes a monitor component 944 that is configured to monitor for downlink control from the base station, e.g., as described in connection with 806 of FIG. 8. The communication manager 932 further includes a determination component 946 that is configured to determine the at least one flexible slot to be an uplink slot or a downlink slot, e.g., as described in connection with 808 of FIG. 8. The communication manager 932 further includes an SFI component 948 that is configured to determine the at least one flexible slot to be the uplink slot or the downlink slot based on the SFI within the DCI, e.g., as described in connection with 810 of FIG. 8. The communication manager 932 further includes a search space component 950 that is configured to receive a search space set configuration, e.g., as described in connection with 812 of FIG. 8. The communication manager 932 further includes a CORESET component 952 that is configured to receive a CORESET configuration, e.g., as described in connection with 814 of FIG. 8. The communication manager 932 further includes a communication component 954 that is configured to transmit or receive communication on the slot, e.g., as described in connection with 816 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving an indication of a slot pattern for a plurality of slots, wherein the slot pattern indicates that each of the plurality of slots comprises one of an uplink slot, a downlink slot, a special slot, or a flexible slot. The apparatus includes means for receiving an indication of a slot pattern for a plurality of slots, wherein the slot pattern indicates the plurality of slots includes at least one flexible slot. The apparatus includes means for receiving a downlink control monitoring occasion configuration. The apparatus includes means for monitoring for downlink control from a base station based at least on the indication of the slot pattern and on the monitoring occasion configuration. The apparatus includes means for determining whether the at least one flexible slot is an uplink slot or a downlink slot based on a DCI. The apparatus includes means for transmitting or receiving communications on the slot based on the determination. The apparatus further includes means for determining the at least one flexible slot to be the uplink slot or the downlink slot based on an SFI within the DCI. The apparatus further includes means for receiving a search space set configuration. The UE monitors for the downlink control from the base station if a search space set occasion based on the search space set configuration occurs in the flexible slot. The apparatus further includes means for receiving a search space set configuration. The UE does not monitor for the downlink control from the base station if a search space set occasion based on the search space set configuration occurs in the flexible slot. The apparatus further includes means for receiving a CORESET configuration. The UE monitors for the downlink control from the base station if at least one symbol of the configured CORESET overlaps with the at least one flexible slot. The apparatus further includes means for receiving a CORESET configuration. The UE does not monitor for the downlink control from the base station if at least one symbol of the configured CORESET overlaps with the at least one flexible slot. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
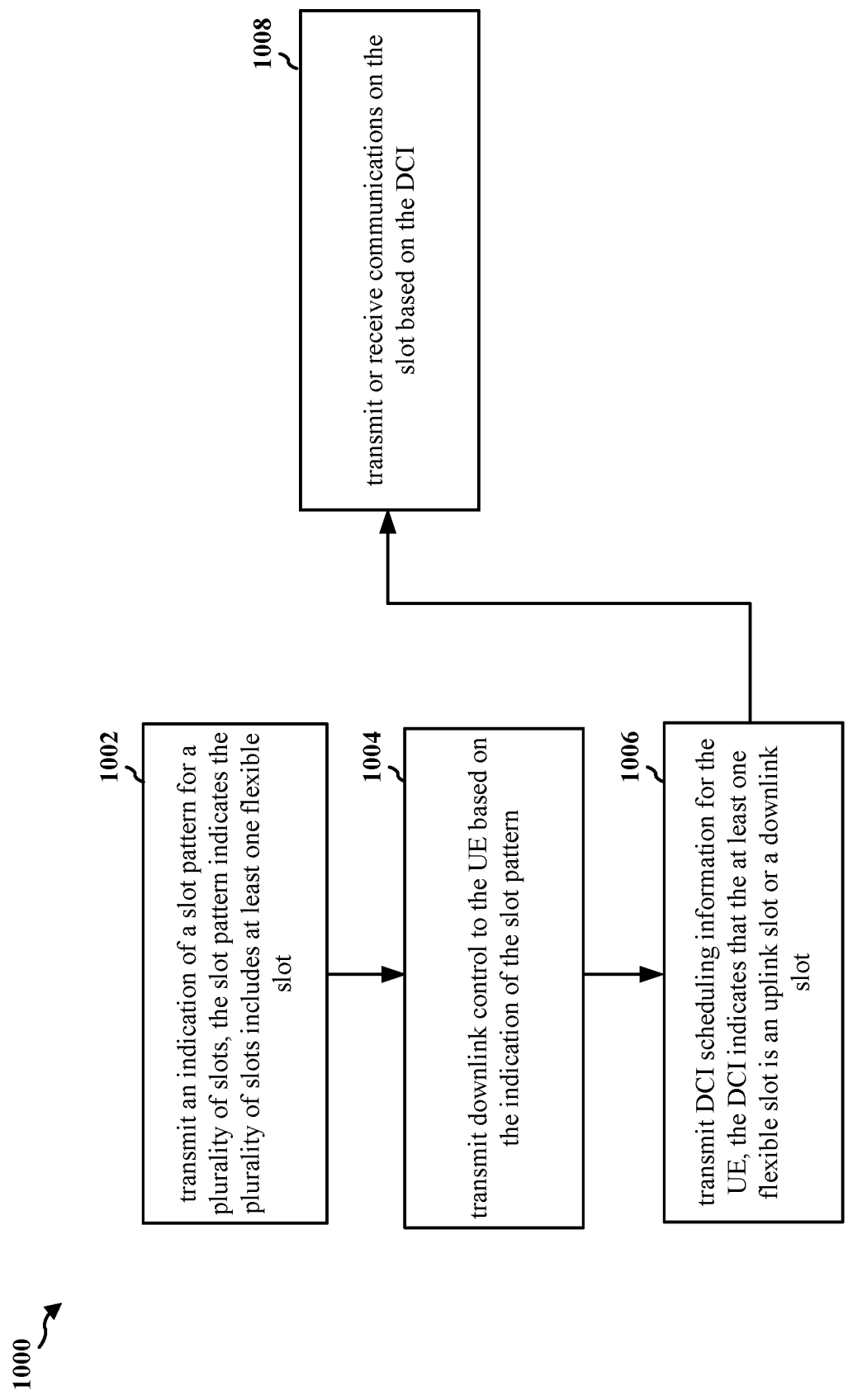
FIG. 10 is a flowchart of a method of wireless communication.

FIG. 10 is a flowchart 1000 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to transmit downlink control to a UE such that the UE may determine a slot direction while operating in a half duplex operation in a FDD mode.

At 1002, the base station may transmit an indication of a slot pattern for a plurality of slots. For example, 1002 may be performed by slot pattern component 1140 of apparatus 1102. The base station may transmit the indication to the UE. The slot pattern may indicate that each of the plurality of slots may comprise one of an uplink slot, a downlink slot, a special slot, or a flexible slot. The slot pattern may indicate the plurality of slots includes at least one flexible slot. In some aspects, the indication of the slot pattern may be transmitted in system information or in RRC signaling. In some aspects, the slot pattern may comprise a UE specific slot pattern or a UE group specific slot pattern.

At 1004, the base station may transmit downlink control to the UE. For example, 1004 may be performed by downlink control component 1142 of apparatus 1102. The base station may transmit downlink control to the UE based at least on the indication of the slot pattern. The UE may monitor for monitor occasions based on the downlink control monitoring occasion configuration.

At 1006, the base station may transmit DCI scheduling communication for the UE. For example, 1006 may be performed by DCI component 1144 of apparatus 1102. The DCI may indicate that the at least one flexible slot is an uplink slot or a downlink slot. In some aspects, for example where the slot of the plurality of slots is a flexible slot, the base station may transmit DCI scheduling communication for the UE, such that the communication scheduled in the DCI indicates that the flexible slot is the uplink slot or the downlink slot. In some aspects, the flexible slot may be indicated to be the uplink slot if the DCI schedules uplink resources for an uplink transmission from the UE. In some aspects, the flexible slot may be indicated to be the downlink slot if the DCI schedules downlink resources for a downlink transmission to the UE. In some aspects, the DCI may comprise an SFI. In some aspects, for example where the slot of the plurality of slots is a flexible slot, the base station may transmit DCI comprising a SFI. The SFI may indicate that the flexible slot may be the uplink slot or the downlink slot.

In some aspects, the base station may transmit a search space set configuration to the UE. In some aspects, the UE may receive the search space set configuration, such that the UE monitors for the downlink control from the base station if a search space set occasion based on the search space set configuration occurs in the flexible slot. In some aspects, the UE may receive the search space set configuration, such that the UE does not monitor for the downlink control from the base station if the search space set occasion based on the search space set configuration occurs in the flexible slot. In some aspects, the base station may transmit downlink control to the UE. The base station may transmit downlink control to the UE based at least in part on the indication of the slot pattern. In some aspects, the base station may transmit a CORESET configuration to the UE. The UE may monitor for downlink control from the base station if at least one symbol of the configured CORSET overlaps with the at least one flexible slots. The UE may not monitor for downlink control from the base station if at least one symbol of the configured CORESET overlaps with the at least one flexible slot.

At 1008, the base station may transmit or receive communications on the slot. For example, 1008 may be performed by communication component 1146 of apparatus 1102. The base station may transmit or receive the communications on the slot based on the DCI indicating that the at least one flexible slot is the uplink slot or the downlink slot.

Figure 11:
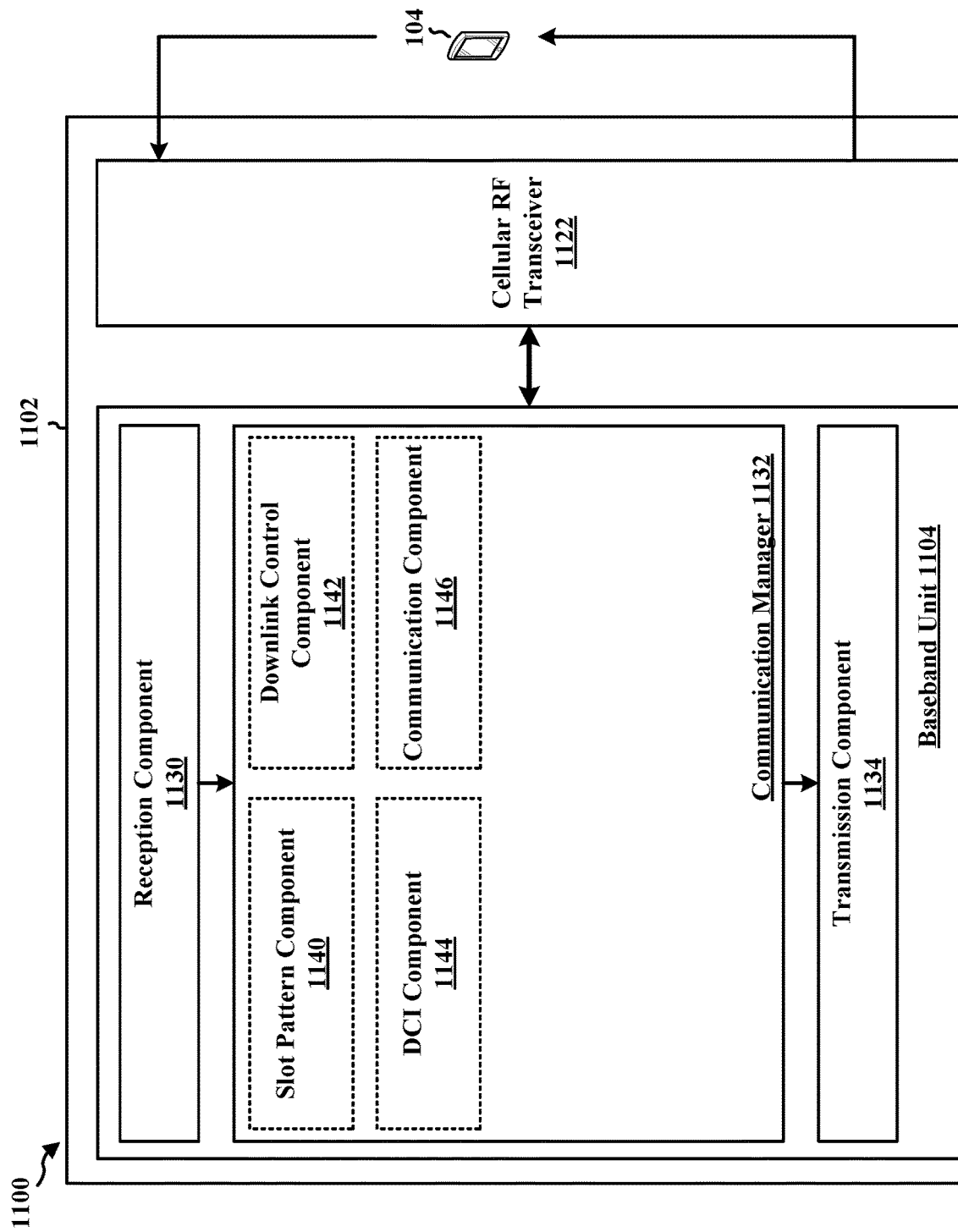
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a slot pattern component 1140 that may transmit an indication of a slot pattern for a plurality of slots, e.g., as described in connection with 1002 of FIG. 10. The communication manager 1132 further includes a downlink control component 1142 that may transmit downlink control to the UE, e.g., as described in connection with 1004 of FIG. 10. The communication manager 1132 further includes a DCI component 1144 configured to transmit DCI scheduling communication for the UE, e.g., as described in connection with 1006 of FIG. 10. The communication manager 1132 further includes a communication component 1146 that may transmit or receive communications on the slot, e.g., as described in connection with 1008 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting an indication of a slot pattern for a plurality of slots. The slot pattern indicates the plurality of slots includes at least one flexible slot. The apparatus includes means for transmitting downlink control to the UE based at least on the indication of the slot pattern. The apparatus includes means for transmitting DCI scheduling communication for the UE. The DCI indicates that the at least one flexible slot is an uplink slot or a downlink slot. The apparatus includes means for transmitting or receiving communications on the slot based on the DCI indicating that the at least one flexible slot is the uplink slot or the downlink slot. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE operating in a half duplex operation in an FDD mode, the method comprising receiving an indication of a slot pattern for a plurality of slots, wherein the slot pattern indicates that the plurality of slots includes at least one flexible slot; receiving a downlink control monitoring occasion configuration; monitoring for downlink control from a base station based at least on the indication of the slot pattern and on the monitoring occasion configuration; determining whether the at least one flexible slot is an uplink slot or a downlink slot based on a DCI; and transmitting or receiving communications on the slot based on the determination.

In Aspect 2, the method of Aspect 1 further includes that the indication of the slot pattern is received in system information or in RRC signaling.

In Aspect 3, the method of Aspects 1 or 2 further includes that the slot pattern comprises a UE specific slot pattern or a UE group specific slot pattern.

In Aspect 4, the method of any of Aspects 1-3 further includes that the flexible slot is determined to be the uplink slot if the DCI schedules uplink resources for an uplink transmission from the UE, and wherein the flexible slot is determined to be the downlink slot if the DCI schedules downlink resources for a downlink transmission to the UE.

In Aspect 5, the method of any of Aspects 1-4 further includes determining the at least one flexible slot to be the uplink slot or the downlink slot based on an SFI within the DCI.

In Aspect 6, the method of any of Aspects 1-5 further includes receiving a search space set configuration, wherein the UE monitors for the downlink control from the base station if a search space set occasion based on the search space set configuration occurs in the flexible slot.

In Aspect 7, the method of any of Aspects 1-6 further includes receiving a search space set configuration, wherein the UE does not monitor for the downlink control from the base station if a search space set occasion based on the search space set configuration occurs in the flexible slot.

In Aspect 8, the method of any of Aspects 1-7 further includes receiving a CORESET configuration, wherein the UE monitors for the downlink control from the base station if at least one symbol of the configured CORESET overlaps with the at least one flexible slot.

In Aspect 9, the method of any of Aspects 1-8 further includes receiving a CORESET configuration, wherein the UE does not monitor for the downlink control from the base station if at least one symbol of the configured CORESET overlaps with the at least one flexible slot.

In Aspect 10, the method of any of Aspects 1-9 further includes that the UE transmits uplink communication to the base station during the search space set occasion that occurs in the flexible slot.

Aspect 11 is a device including one or more processors and one or more memories in electronic communication with the one or more processors storing instructions executable by the one or more processors to cause the system or apparatus to implement a method as in any of Aspects 1-10.

Aspect 12 is a system or apparatus including means for implementing a method or realizing an apparatus as in any of Aspects 1-10.

Aspect 13 is a non-transitory computer readable medium storing instructions executable by one or more processors to cause the one or more processors to implement a method as in any of Aspects 1-10.

Aspect 14 is a method of wireless communication at a base station communicating with a UE operating in a half duplex operation in an FDD mode, the method comprising transmitting an indication of a slot pattern for a plurality of slots, wherein the slot pattern indicates that the plurality of slots includes at least one flexible slot; transmitting downlink control to the UE based at least on the indication of the slot pattern; transmitting DCI scheduling communication for the UE, wherein the DCI indicates that the at least one flexible slot is an uplink slot or a downlink slot; and transmitting or receiving communications on the slot based on the DCI indicating that the at least one flexible slot is the uplink slot or the downlink slot.

In Aspect 15, the method of Aspect 14 further includes that the indication of the slot pattern is transmitted in system information or in RRC signaling.

In Aspect 16, the method of Aspect 14 or 15 further includes that the slot pattern comprises a UE specific slot pattern or a UE group specific slot pattern.

In Aspect 17, the method of any of Aspects 14-16 further includes that the flexible slot is indicated to be the uplink slot if the DCI schedules uplink resources for an uplink transmission from the UE, and wherein the flexible slot is indicated to be the downlink slot if the DCI schedules downlink resources for a downlink transmission to the UE.

In Aspect 18, the method of any of Aspects 14-17 further includes that the DCI comprises a SFI, wherein the SFI indicates that the at least one flexible slot is the uplink slot or the downlink slot.

Aspect 19 is a device including one or more processors and one or more memories in electronic communication with the one or more processors storing instructions executable by the one or more processors to cause the system or apparatus to implement a method as in any of Aspects 14-18.

Aspect 20 is a system or apparatus including means for implementing a method or realizing an apparatus as in any of Aspects 14-18.

Aspect 21 is a non-transitory computer readable medium storing instructions executable by one or more processors to cause the one or more processors to implement a method as in any of Aspects 14-18.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) operating in a half duplex operation in a frequency division duplexing (FDD) mode, the method comprising:
   receiving an indication of a slot pattern for a plurality of slots, wherein the slot pattern indicates the plurality of slots includes at least one flexible slot;
   receiving a downlink control monitoring occasion configuration;
   monitoring for downlink control from a base station based at least on the indication of the slot pattern and on the monitoring occasion configuration;
   determining whether the at least one flexible slot is an uplink slot or a downlink slot based on a downlink control information (DCI); and
   transmitting or receiving communications on the slot based on the determination.

2. The method of claim 1, wherein the indication of the slot pattern is received in system information or in radio resource control (RRC) signaling.

3. The method of claim 1, wherein the slot pattern comprises a UE specific slot pattern or a UE group specific slot pattern.

4. The method of claim 1, wherein the flexible slot is determined to be the uplink slot if the DCI schedules uplink resources for an uplink transmission from the UE, and wherein the flexible slot is determined to be the downlink slot if the DCI schedules downlink resources for a downlink transmission to the UE.

5. The method of claim 1, further comprising:
   determining the at least one flexible slot to be the uplink slot or the downlink slot based on a slot format indicator (SFI) within the DCI.

6. The method of claim 1, further comprising:
   receiving a search space set configuration, wherein the UE monitors for the downlink control from the base station if a search space set occasion based on the search space set configuration occurs in the flexible slot.

7. The method of claim 1, further comprising:
   receiving a search space set configuration, wherein the UE does not monitor for the downlink control from the base station if a search space set occasion based on the search space set configuration occurs in the flexible slot.

8. The method of claim 1, further comprising:
receiving a CORESET configuration, wherein the UE monitors for the downlink control from the base station if at least one symbol of the configured CORESET overlaps with the at least one flexible slot.

9. The method of claim 1, further comprising:
receiving a CORESET configuration, wherein the UE does not monitor for the downlink control from the base station if at least one symbol of the configured CORESET overlaps with the at least one flexible slot.

10. The method of claim 7, wherein the UE transmits uplink communication to the base station during the search space set occasion that occurs in the flexible slot.

11. An apparatus for wireless communication at a user equipment (UE) operating in a half duplex operation in a frequency division duplexing (FDD) mode, comprising:
a memory; and
at least one processor coupled to the memory and configured to:
receive an indication of a slot pattern for a plurality of slots, wherein the slot pattern indicates the plurality of slots includes at least one flexible slot;
receive a downlink control monitoring occasion configuration;
monitor for downlink control from a base station based at least on the indication of the slot pattern and on the monitoring occasion configuration;
determine whether the at least one flexible slot is an uplink slot or a downlink slot based on a downlink control information (DCI); and
transmitting or receiving on the slot based on the determination.

12. The apparatus of claim 11, wherein the indication of the slot pattern is received in system information or in radio resource control (RRC) signaling.

13. The apparatus of claim 11, wherein the slot pattern comprises a UE specific slot pattern or a UE group specific slot pattern.

14. The apparatus of claim 11, wherein the flexible slot is determined to be the uplink slot if the DCI schedules uplink resources for an uplink transmission from the UE, and wherein the flexible slot is determined to be the downlink slot if the DCI schedules downlink resources for a downlink transmission to the UE.

15. The apparatus of claim 11, wherein the at least one processor further configured to:
determine the at least one flexible slot to be the uplink slot or the downlink slot based on a slot format indicator (SFI) within the DCI.

16. The apparatus of claim 11, wherein the at least one processor further configured to:
receive a search space set configuration, wherein the UE monitors for the downlink control from the base station if a search space set occasion based on the search space set configuration occurs in the flexible slot.

17. The apparatus of claim 11, wherein the at least one processor further configured to:
receive a search space set configuration, wherein the UE does not monitor for the downlink control from the base station if a search space set occasion based on the search space set configuration occurs in the flexible slot.

18. The apparatus of claim 11, wherein the at least one processor further configured to:
receive a CORESET configuration, wherein the apparatus monitors for the downlink control from the base station if at least one symbol of the configured CORESET overlaps with the at least one flexible slot.

19. The apparatus of claim 11, wherein the at least one processor further configured to:
receive a CORESET configuration, wherein the apparatus does not monitor for the downlink control from the base station if at least one symbol of the configured CORESET overlaps with the at least one flexible slot.

20. The apparatus of claim 11, wherein the at least one processor further configured to:
transmit uplink communication to the base station during the search space set occasion that occurs in the flexible slot.

21. A method of wireless communication at a base station communicating with a user equipment (UE) operating in a half duplex operation in a frequency division duplexing (FDD) mode, the method comprising:
transmitting an indication of a slot pattern for a plurality of slots, wherein the slot pattern indicates the plurality of slots includes at least one flexible slot;
transmitting downlink control to the UE based at least on the indication of the slot pattern;
transmitting downlink control information (DCI) scheduling communication for the UE, wherein the DCI indicates that the at least one flexible slot is an uplink slot or a downlink slot; and
transmitting or receiving communications on the slot based on the DCI indicating that the at least one flexible slot is the uplink slot or the downlink slot.

22. The method of claim 21, wherein the indication of the slot pattern is transmitted in system information or in radio resource control (RRC) signaling.

23. The method of claim 21, wherein the slot pattern comprises a UE specific slot pattern or a UE group specific slot pattern.

24. The method of claim 21, wherein the flexible slot is indicated to be the uplink slot if the DCI schedules uplink resources for an uplink transmission from the UE, and wherein the flexible slot is indicated to be the downlink slot if the DCI schedules downlink resources for a downlink transmission to the UE.

25. The method of claim 21, wherein the DCI comprises a slot format indicator (SFI), wherein the SFI indicates that the at least one flexible slot is the uplink slot or the downlink slot.

26. An apparatus for wireless communication at a base station communicating with a user equipment (UE) operating in a half duplex operation in a frequency division duplexing (FDD) mode, comprising:
a memory; and
at least one processor coupled to the memory and configured to:
transmit an indication of a slot pattern for a plurality of slots, wherein the slot pattern indicates the plurality of slots includes at least one flexible slot;
transmit downlink control to the UE based at least on the indication of the slot pattern;
transmit downlink control information (DCI) scheduling communication for the UE, wherein the DCI indicates that the flexible slot is an uplink slot or a downlink slot; and
transmit or receive communications on the slot based on the DCI indicating that the at least one flexible slot is the uplink slot or the downlink slot.

27. The apparatus of claim 26, wherein the slot pattern comprises a UE specific slot pattern or a UE group specific slot pattern.

28. The apparatus of claim 26, wherein a slot of the plurality of slots is the flexible slot, the at least one processor further configured to:
   transmit downlink control information (DCI) scheduling communication for the UE, wherein the communication scheduled in the DCI indicates that the flexible slot is the uplink slot or the downlink slot.

29. The apparatus of claim 26, wherein the flexible slot is indicated to be the uplink slot if the DCI schedules uplink resources for an uplink transmission from the UE, and wherein the flexible slot is indicated to be the downlink slot if the DCI schedules downlink resources for a downlink transmission to the UE.

30. The apparatus of claim 26, wherein the DCI comprises a slot format indicator (SFI), wherein the SFI indicates that the at least one flexible slot is the uplink slot or the downlink slot.

* * * * *